April 14, 1953 — M. McGRAW — 2,634,526
STEAM IRON
Filed July 29, 1947 — 2 SHEETS—SHEET 1
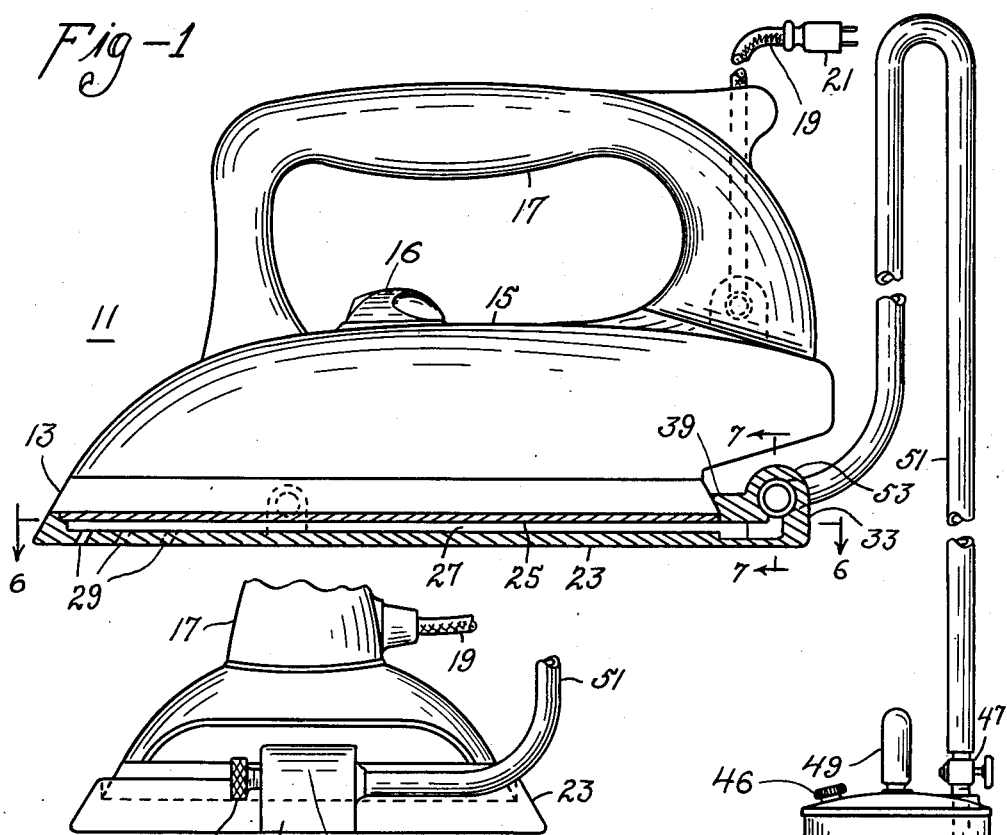
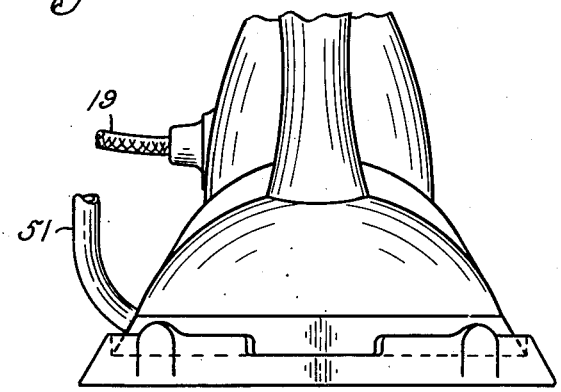
INVENTOR.
MAX McGRAW
BY
ATTY

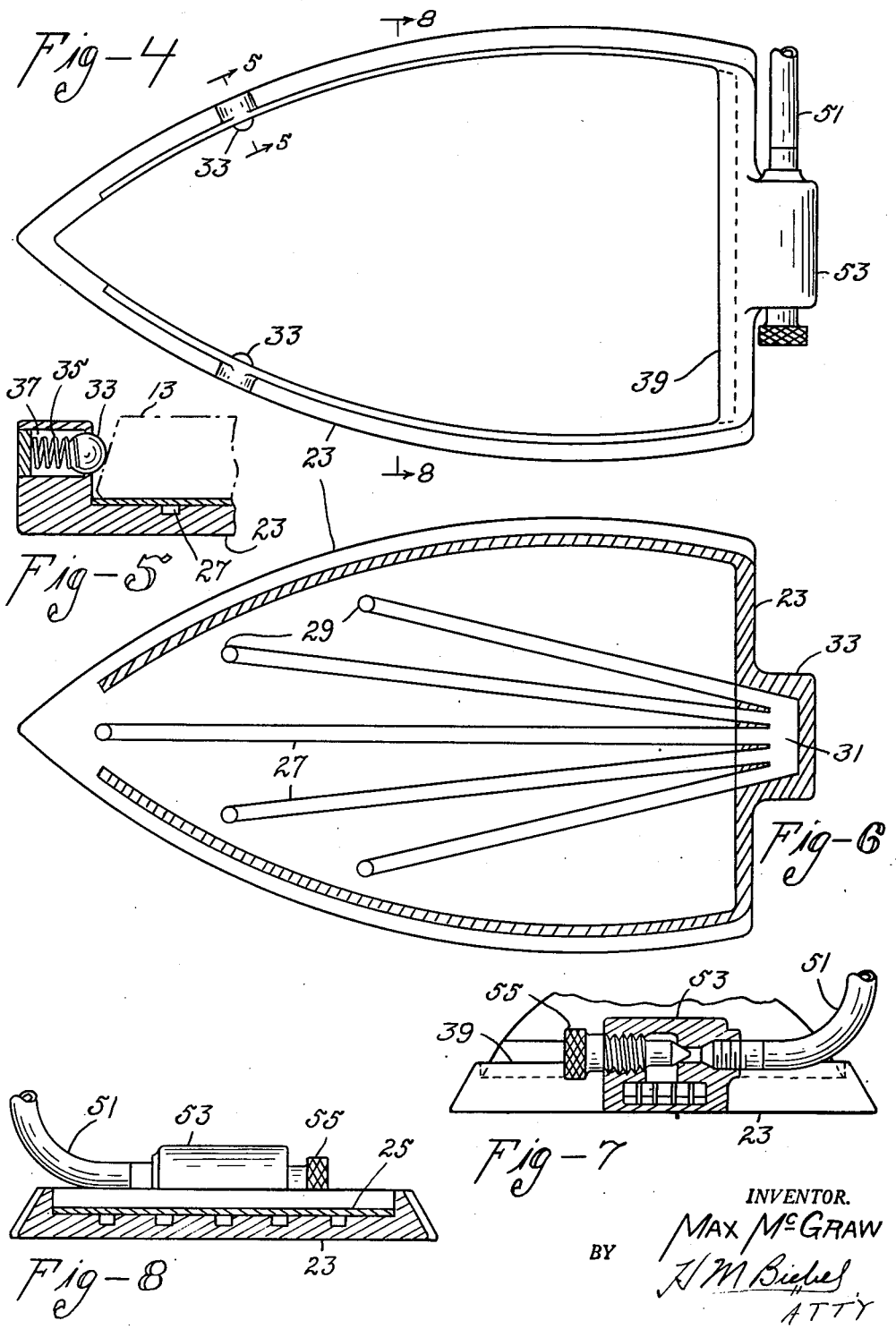

Patented Apr. 14, 1953

2,634,526

UNITED STATES PATENT OFFICE 2,634,526

STEAM IRON

Max McGraw, Chicago, Ill., assignor to McGraw Electric Company, Elgin, Ill., a corporation of Delaware Application July 29, 1947, Serial No. 764,485

4 Claims. (Cl. 38—77)

My invention relates to steam irons, to water-feed for steam irons, and to steaming attachments for standard electric irons.

One object of my invention is the provision of an improved and convenient water supply for a steam iron.

Another object is the provision of a convenient pressure tank separate from the iron itself but fully portable, for supplying water to the iron.

Another object is the provision of a water supply that is conveniently portable, yet large enough to require only infrequent refilling.

Still another object of my invention is to provide a relatively simple steam attachment for an electric iron.

Another object is to provide a steam attachment for an electric iron that shall be easily and quickly attached and removed.

Another object is to provide a steam attachment for an electric iron that shall be usable for other purposes.

In the drawings,

Figure 1 is a view partly in side elevation and partly in section showing a device embodying my invention attached to a standard flatiron, Fig. 2 is a fragmentary rear elevational view of the parts in Fig. 1, Fig. 3 is a fragmentary front elevational view of the parts shown in Fig. 1, Fig. 4 is a top plan view of the steam attachment embodying my invention, Fig. 5 is a fragmentary sectional view taken on the line 5—5 of Fig. 4, Fig. 6 is a horizontal sectional view on the line 6—6 of Fig. 1, Fig. 7 is a fragmentary sectional view taken on the line 7—7 of Fig. 1, and Fig. 8 is a fragmentary sectional view taken on the line 8—8 of Fig. 4.

In accordance with my present invention I provide a pressing iron having a steam generating chamber and means for supplying a regulated flow of water to the iron, said means comprising a portable pressure tank detached from the iron. The tank is large enough to receive several gallons of water at a single filling so that the desirable precaution of using distilled water in such an iron need not entail objectionable effort. I further provide a steaming attachment for a standard dry electric iron that can be quickly and easily snapped on and off. Preferably, I provide a thermostatically-regulated, electric iron of the dry type and a steaming attachment therefor which receives a regulated flow of water from a portable pressure tank located below the plane of use of the iron, the iron itself having no space for heating or storing water, but rather being adapted to flash the water to steam.

Referring first of all to Fig. 1 of the drawings, I have there shown an automatic electric iron 11 which I have shown generally only and which comprises a soleplate 13, a top plate (not shown), a cover or casing 15, a regulator 16 and a handle 17. I have not shown an electric heater in detail but have shown a twin conductor cord 19 having a plug 21 connected therewith. The general construction of the electric iron 11 may be any suitable kind such as now used, but preferably with thermostatic control, since the steaming attachment of my invention is designed to be easily and quickly attached to a standard normal dry electric iron for steam ironing.

The device more particularly embodying my invention provides a lower metallic member 23 which is of substantially the same general contour as is the soleplate 13 of the iron, and is provided with a plurality of grooves 27, as shown in Fig. 6, extending from the rear end of member 23 into the front portion of member 23 and ending in openings 29 extending downwardly through member 23. To conform to usual iron shape the front portion of member 23 tapers forwardly to a pointed front end. As shown, the series of grooves 27 may be made of different length so that their front extremities and openings 29 will be located at different longitudinally and laterally spaced points over any desired area of the sole plate from which steam is to be discharged. I provide further a top plate 25 which is secured to the upper surface of member 23, making a water-tight and thermally-conducting connection therewith, as shown best in Fig. 8, so that each groove 27 constitutes a separate duct for receiving water and for generating steam. The rear ends of the grooves 27 are located in a common plane parallel with the bottom surface of the sole plate and each of such ends communicates directly with a water distributing chamber 31 which is located in and extends transversely of a rearward extension 33 constituting an integral part of member 23. Water entering the attachment comprising members 23 and 25 will have easy access from chamber 31 to all of the grooves 27.

Means for securing the steaming attachment comprising members 23 and 25 may include a pair of balls 33 spring-pressed toward soleplate 13 by springs 35, balls 33 and springs 35 being positioned in a slot or recess 37 located one at each side of the tapered front portion of member 23, and spring 35 in slot 37 being effective to press ball 33 outwardly as far as will be permitted by the inturned inner end of the walls of slot 37. The wall provided around member 23 extends substantially vertically at each side thereof but is undercut on a bevel at the rear side, as may be seen by reference to Fig. 4 of the drawings where I have designated this wall by numeral 39. This construction permits the steaming attachment to be simply snapped on or off the iron. Thus, when it is desired to attach the steaming attachment to an iron it is necessary only to place the rear end of iron 11 with its outwardly bevelled rear lower edge of member 13 in engagement with wall 39 and with its front end portion held above the level of member 23, after which it is necessary only to press downwardly upon handle 17 and force the lower portions of the bevelled opposite side edges of soleplate 13 below the two balls 33 substantially as shown in Fig. 5 of the drawings. The attachment may be removed by holding down its toe while lifting the handle of the iron.

I have shown means for providing water to be vaporized in the grooves 27, this means comprising a three-gallon or possibly a five-gallon tank 41, which tank may be provided with carrying means 43 and 45, a filling port 46, as well as a valve-controlled outlet 47. I provide further a means for placing the water contained in tank 41 under gas pressure, such as for instance a small casing 49 which is filled with carbon dioxide. I provide a suitable flexible tube 51 which is connected to valve 47 at one end thereof while its other end is connected to the interior portion of the upwardly projecting port 53 of extension 33 which has an adjustable valve 55 extending thereinto. The design and construction of member 53, together with its valve 55, is such that valve 55 may be adjusted to permit of the in-flow of a predetermined amount of water into member 53, the adjustment of valve 55 being made in accordance with the pressure provided in tank 41 and the amount of steam which may be desired to be generated in the grooves or slots 27, which steam leaves slots 27 through openings 29. Alternatively, or in addition, the flow of water may be regulated by valve 47 at the supply tank.

One of the drawbacks to the use of water in steam irons has been the troubles incident to the use of ordinary tap water. Tap water generally contains dissolved minerals which collect in the steam-generating chamber of the iron as a hard lime-like crust that stops up the valve and the steam chambers. Distilled water contains no dissolved material and so leaves the iron clean, though its use entails some inconveniences. The use of a tank small enough to be portable and to be handled easily, but large enough to hold water for a prolonged use of the iron, alleviates these inconveniences and so invites the use of distilled water. The flexible tube 51 is easily and quickly removable from the iron and from the valve 47 so that the water in pressure tank 41 may easily be used for other purposes. Thus anyone liking to make up a charged drink in his own home would have highly charged water available easily and quickly.

I prefer to use a metal or alloy having a high heat storage characteristic and high thermal conductivity, such as brass or copper, for making the soleplate 23 and prefer also to so construct the addition comprising the soleplate 23, as well as the cover plate 25, that there will be no leakage around the edges of the top plate 25 so that the soleplate 13 and particularly the ironing surface thereof will not be subjected to escaping steam. In the design shown in the drawings the attachment will be in intimate heat-transmitting engagement with the surface of the soleplate 13 whereby it is possible to obtain a relatively high temperature on the ironing surface of the soleplate 23.

The grooves 27 may be made wide or relatively narrow and the openings 29, while shown as being placed toward the front end of soleplate 23, may also be varied as to size and position and the direction in which they extend through soleplate 23.

The water in the portable supply tank 41 may be placed under pressure by any known means, such as by air admitted from a high pressure supply through a check valve of the type used on pneumatic tires. But I prefer to use carbon dioxide which is available commercially in small high-pressure capsules. My improved water supply may be used with any steaming iron whether the steaming element is an integral part of the iron or an attachment, and whether heated electrically or otherwise, and whether thermostatically controlled or not.

Thus my present invention makes the use of distilled or other special water in an iron a tolerable precaution, and it provides a relatively simple steam attachment which can be easily and quickly attached to and removed from a standard electric iron.

Various modifications may be made in the device embodying my invention without departing from the spirit and scope thereof and I desire that all such modifications coming clearly within the scope of the appended claims shall be considered a part of my invention.

I claim as my invention:

1. In a steam generating attachment for electric pressing irons, a thin metal sole plate adapted to be heated by an electric pressing iron and having a forwardly tapering front portion, an undercut wall extending upwardly from the rear end of said sole plate adapted to removable gripping engagement with the bevelled rear edge of an electric pressing iron sole plate and laterally movable spring-pressed detents mounted at the opposite side edges of the forwardly tapering front portion of said sole plate and adapted to removable gripping engagement with the bevelled opposite side edges of an electric pressing iron sole plate and to hold the bevelled rear edge of an electric pressing iron sole plate against said undercut wall, said spring-pressed detents having inclined surfaces adapting said detents to be moved laterally outwardly by the opposite edges of an electric pressing iron sole plate under relative vertical movement between the two sole plates to and away from each other and permitting the wider lower portions of the opposite edges of the iron sole plate to pass said detents.

2. A steam generating attachment for an electric pressing iron comprising a thin metal sole plate adapted to be heated by an electric pressing iron, a water distributing chamber extending transversely in the rear portion of said sole plate, a water supply inlet connection communicating with said water distributing chamber, a series of separate water and steam passages formed in the sole plate having separate rear ends located in a common plane parallel with the bottom surface of the sole plate, said rear ends of the passages each communicating directly with said water distributing chamber, said passages extending forwardly from said chamber through said sole plate into different areas of the front portion of said sole plate, steam exit ports formed in the lower front portion of said sole plate communicating with said steam passages for discharging steam from said passages through the ironing face of said sole plate and attaching means on said sole plate adapted to removably hold said sole plate on the ironing face of an electric pressing iron.

3. A steam generating attachment for an electric pressing iron comprising a thin metal sole plate adapted to be heated by an electric pressing iron, a water distributing chamber extending transversely in the rear portion of said sole plate, a water supply inlet connection communicating with said water distributing chamber, a series of separate water and steam passages of various lengths formed in the sole plate having separate rear ends located in a common plane parallel with the bottom surface of the sole plate, said rear ends of the passages each communicating with said water distributing chamber, said passages extending forwardly from said chamber through said sole plate and terminating at a number of different longitudinally and laterally spaced points in the front portion of said sole plate, steam exit ports formed in the lower front portion of said sole plate communicating with said steam passages for discharging steam from said passages through the ironing face of said sole plate and attaching means on said sole plate adapted to removably hold said sole plate on pressing the ironing face of an electric pressing iron.

4. A steam generating attachment for an electric pressing iron comprising a thin metal sole plate adapted to be heated by an electric pressing iron and having a rearward extension of reduced width, a water distributing chamber extending transversely in said rearward extension of said sole plate, a water inlet connection attached to said rearward extension of said sole plate and communicating with said water distributing chamber, a series of separate water and steam passages formed in the sole plate having separate rear ends located in a common plane parallel with the bottom surface of the sole plate, said rear ends of the passages each communicating directly with said water distributing chamber, said passages extending forwardly from said chamber through said sole plate into different areas of the front portion of said sole plate, steam exit ports formed in the lower front portion of said sole plate communicating with said steam passages for discharging steam from said passages through the ironing face of said sole plate and attaching means adapted to removably hold said sole plate on the ironing face of an electric pressing iron.

MAX McGRAW.

References Cited in the file of this patent

UNITED STATES PATENTS

| Number | Name | Date |
|---|---|---|
| 32,304 | McClure | May 14, 1861 |
| 265,281 | Rawson et al. | Oct. 3, 1882 |
| 1,162,703 | Lowe | Nov. 30, 1915 |
| 1,293,216 | Seifert | Feb. 4, 1919 |
| 1,552,720 | Marcus | Sept. 8, 1925 |
| 1,799,281 | Cissell | Apr. 7, 1931 |
| 1,842,784 | Houston | Jan. 26, 1932 |
| 1,938,883 | Winnewisser | Dec. 12, 1933 |
| 1,958,876 | Wright | May 15, 1934 |
| 1,963,858 | Meidell | June 19, 1934 |
| 2,149,929 | Plastaras | Mar. 7, 1939 |
| 2,222,247 | Ward | Nov. 19, 1940 |
| 2,302,264 | Schwartz | Nov. 17, 1942 |
| 2,326,890 | Schwartz | Aug. 17, 1943 |
| 2,334,222 | Schoell | Nov. 16, 1943 |
| 2,432,205 | Morton | Dec. 9, 1947 |